United States Patent [19]
Washisu

[11] Patent Number: 4,757,257
[45] Date of Patent: Jul. 12, 1988

[54] MAGNETORESISTIVE DISPLACEMENT SENSOR AND SIGNAL PROCESSING CIRCUIT

[75] Inventor: Koichi Washisu, Tokyo, Japan

[73] Assignee: Canon Kabushiki Kaisha, Tokyo, Japan

[21] Appl. No.: 738,683

[22] Filed: May 28, 1985

[30] Foreign Application Priority Data

| May 28, 1984 | [JP] | Japan | 59-108901 |
| Jul. 31, 1984 | [JP] | Japan | 59-158749 |
| Sep. 27, 1984 | [JP] | Japan | 59-202335 |

[51] Int. Cl.⁴ ............ G01B 7/14; G01R 33/02
[52] U.S. Cl. ............... 324/208; 324/252; 338/32 R
[58] Field of Search ........... 324/207, 208, 252; 338/32 R; 307/309

[56] References Cited

U.S. PATENT DOCUMENTS

| 4,274,053 | 6/1981 | Ito et al. | 324/208 |
| 4,319,188 | 3/1982 | Ito et al. | 324/208 |
| 4,429,276 | 1/1984 | Narimatsu et al. | 324/207 |
| 4,599,561 | 7/1986 | Takahashi et al. | 324/208 |
| 4,603,365 | 7/1986 | Nakamura | 360/113 |
| 4,616,281 | 12/1986 | Nakamura | 324/252 |

Primary Examiner—Reinhard J. Eisenzopf
Assistant Examiner—Walter E. Snow
Attorney, Agent, or Firm—Toren, McGeady & Associates

[57] ABSTRACT

The disclosed device prevents the adverse effect of self-demagnetization from occurring at a continuous long coded part on a code plate arranged to permit detection of an absolute position. A magnetoresistive displacement sensor and signal processing circuit is arranged to have the code composed of magnetic domains of opposite polarities. A plurality of heads are arranged to slide over the coded part. The output signals of these heads are processed through a signal processing circuit.

5 Claims, 9 Drawing Sheets

TRACK 7 | S | N | S | N | S | N | — 3a"
TRACK 6 | N | S | N | S | N | S | — 3a'

MAGNETORESISTIVE DISPLACEMENT SENSOR AND SIGNAL PROCESSING CIRCUIT

BACKGROUND OF THE INVENTION

1. Field of the Invention

This invention relates to a position detecting device using magnetism.

2. Description of the Prior Art

Figure 1:
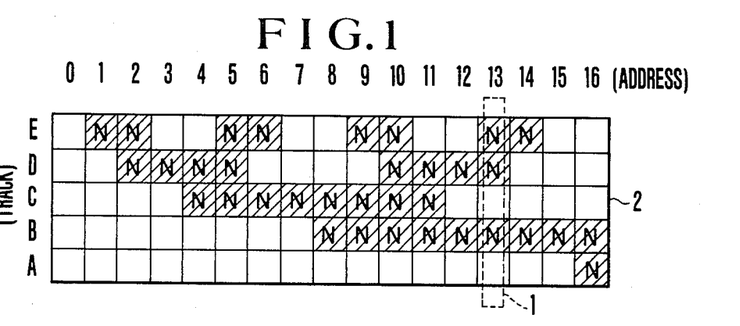
FIG. 1 is a plan view showing a conventional magnetic code plate.
Figure 2:
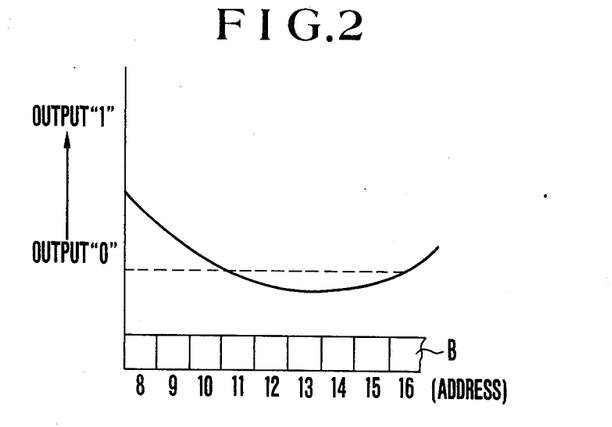
FIG. 2 is an illustration of outputs obtained with the magnetic code plate which is shown in FIG. 1 read by a magnetic sensor.

It has been a common shortcoming of conventional magnetic position detecting devices that, where a code on a magnetic code plate, such as a magnetic recording tape or the like is long, the output level of the device drops at points of the code other than the beginning and end. Where a magnetic code plate 2 is provided with Gray codes as shown in FIG. 1 of the accompanying drawing, and, for example the device is an absolute position detecting device, it has been impossible to read higher place bits of some codes when the code is a long signal (tracks B and C in FIG. 1). More specifically, when the length of a magnetized pattern (or code) is long, as represented by the track B in FIG. 1, for example, the output of the device obtained as a result of reading with a magnetic sensor 1 is shown in FIG. 2. The output for the address 13 of the track B, for example, becomes "0", which is the same as the output obtained when the sensor 1 is at another address 2 shown in FIG. 1. Such an error causes confusion. Further, the sensor 1 is arranged to produce "1" at a magnetized part and "0" at a part which is not magnetized (the parts not hatched in the drawing). In FIG. 1, the magnetized parts are of N polarity. However, magnetization may be of S polarity. In that event, the sensor produces "−1" instead of "1". In other words, the conventional magnetic position detecting devices have required some additional arrangement to prevent the adverse effect of self-demagnetization.

SUMMARY OF THE INVENTION

A first object of this invention is to provide a position detecting device which eliminates the shortcoming of the conventional position detecting devices mentioned above.

A second object of this invention is to provide a magnetic position detecting device wherein, to achieve the above-stated first object, at least one of a plurality of codes constituting a magnetic code plate is formed by magnetic domains of opposite polarities with magnetic domains of one polarity arranged alternately with domains of the other polarity at predetermined intervals.

A third object of this invention is to provide a magnetic position detecting device wherein, under the above-stated second object, each of the above-stated codes consists of two rows of codes which are arranged to be at different phases; and two magnetic detection heads for reading these codes are arranged to correspond to these two rows of codes.

A fourth object of this invention is to provide a magnetic position detecting device wherein, under the above-stated third object, the magnetic detection heads reading the above-stated codes include two heads which are spaced at a predetermined interval in their scanning direction.

These and further objects and features of this invention will become apparent from the following detailed description of preferred embodiments thereof taken in connection with the accompanying drawings.

DETAILED DESCRIPTION OF THE PREFERRED EMBODIMENTS

Figure 3:
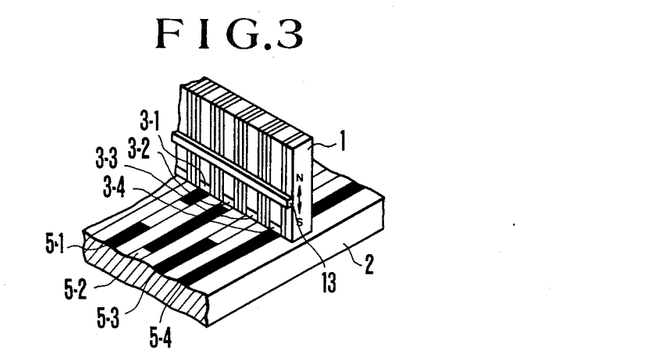
FIG. 3 is an oblique view schematically showing a position detecting device arranged according to this invention as a first embodiment thereof.

FIG. 3 schematically shows a position detecting device arranged according to this invention as a first embodiment thereof. In the drawing, a reference numeral 2 denotes a vertical magnetic medium similar to the one shown in FIG. 1. Gray codes 5-1 to 5-4 are recorded on the medium 2. Heads 3-1 to 3-4 are multi-track heads which operate on a principle different from that of ordinarily employed heads which are arranged to detect variations in a magnetic flux. Signals recorded in tracks of the Gray codes 5-1 to 5-4 are arranged to be reproduced by the multi-track heads 3-1 to 3-4 in detecting absolute positions including a reposed position. The absolute positions are detected through signals reproduced by the heads 3-1 to 3-4 wherever these heads are located relative to the medium. Even when the power supply to a signal processing circuit which is not shown but includes the heads 3-1 to 3-4 happens to turn off, the positions of the heads 3-1 to 3-4 can be immediately detected when the power supply again turns on. A magnet 13 which is mounted on the MR heads 3-1 to 3-4 is arranged to produce a bias magnetic field. With the magnet 13 thus mounted, the magnetic field around the MR heads 3-1 to 3-4 can be stabilized.

The MR heads 3-1 to 3-4 are formed by a magnetoresistive film material and are arranged to have their resistance values vary with variations in the magnetic field. The resistance value decreases as the magnetic field increases. Conversely, the resistance value increases as the magnetic field decreases. This characteristic remains unchanged by the polarity of the magnetic field. Therefore, with the magnet 13 which is provided with N and S poles mounted on the MR heads 3-1 to 3-4 as shown in the drawing and arranged to apply bias magnetic fields, the resistance values of the MR heads 3-1 to 3-4 are small even when these heads are located at non-magnetized parts of the vertical magnetic medium. When the vertical magnetic medium is magnetized to have the N pole at the magnetized surface, the resistance value decreases. If the medium is magnetized to have the S pole at the surface, the resistance value increases as the magnetic field of the magnet 13 is offset by the magnetic field of the magnetized part of the vertical magnetic medium.

Figure 4A:
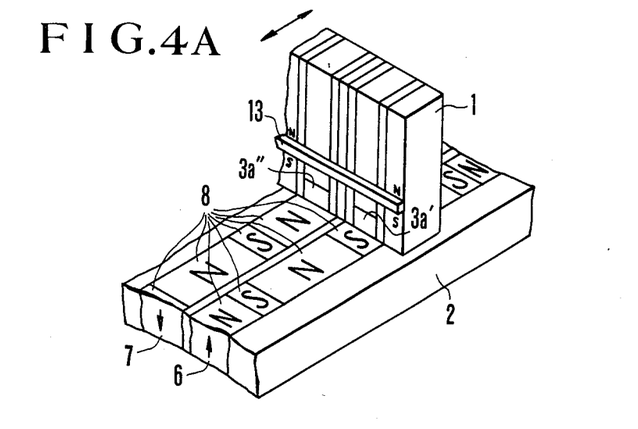
FIG. 4A is an enlarged view showing a part around a code 5-4 shown in FIG. 3.
Figure 4B:
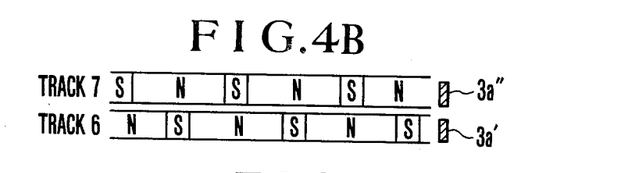
FIG. 4B is a plan view showing tracks 7 and 6 forming the above-stated code 5-4.
Figure 4C:
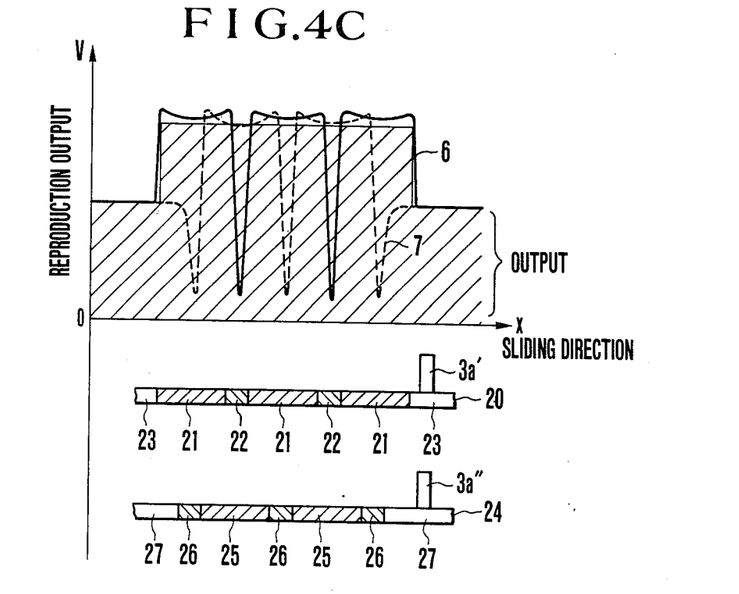
FIG. 4C shows outputs obtained when head 3a' and 3a" slide over the code 5-4.

FIG. 4A is an enlarged view of a part of FIG. 3 around a code 5-4 showing the higher places of the code. The code 5-4 is divided into two tracks 6 and 7. Each of the tracks consists of N and S poles which differ in length from each other. The phases of these tracks 6 and 7 differ from each other as shown in FIG. 4B in a plan view. Further, the length of each of the poles 8 is arranged to be sufficiently short relative to the code 5-4 so that the self-demagnetization of the code can be lessened. Meanwhile, the head 3-4 which is arranged to slide over the code 5-4, is composed of two heads 3a' and 3a". With the heads 3a' and 3a" sliding over the code 5-4, reproduction outputs are obtained as shown in FIG. 4C. In FIG. 4C, the reproduction output of the head 3a' is indicated by full lines while that of the other head 3a" is indicated by broken lines. FIG. 4C includes expediently shown codes 20 and 24 which show the sectional views of the tracks 6 and 7 to depict a positional relationship between the code and the outputs of the heads 3a' and 3a". Reference numerals 21 and 25 denote the parts magnetized to have N pole surfaces and numerals 22 and 26 the parts magnetized to have S pole surfaces. Numerals 23 and 27 denote non-recorded parts. If a known selection circuit is arranged to selectively produce the larger of the reproduction outputs of the heads 3a' and 3a", one signal which is not affected by the influence of the self-demagnetization can be taken out, as indicated by hatching in FIG. 4C.

In the embodiment described above, one code is divided into two recording tracks. Two heads are arranged to slide over these two tracks and thus to have one code detected by means of two heads. In a second embodiment of this invention, however, one code is not divided into two tracks and is detected by two heads which are spaced in their position detecting direction at a distance ½ the length of each magnetic domain of the code 5-4.

Figure 5:
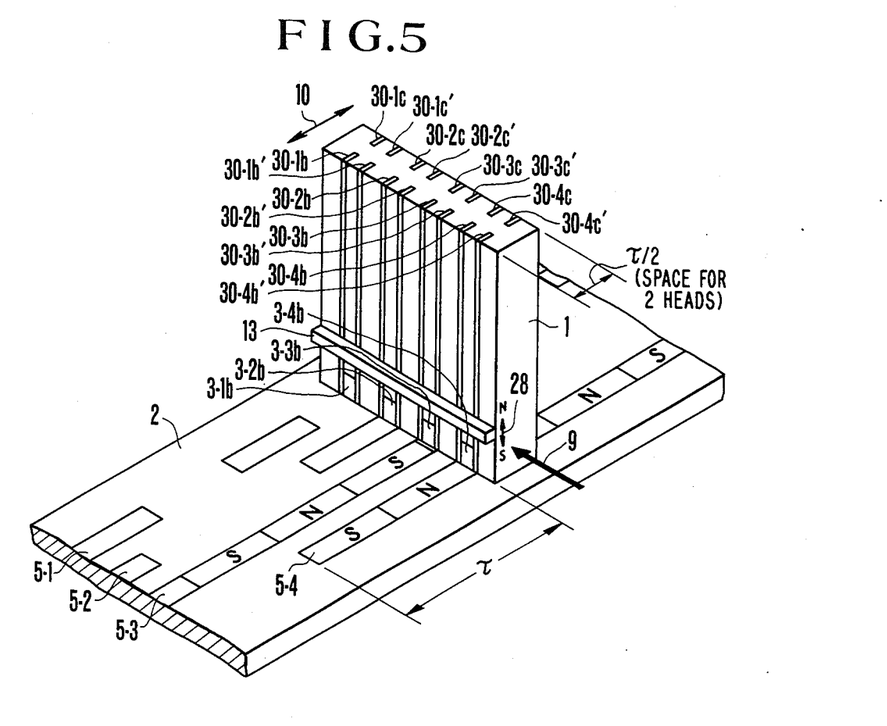
FIG. 5 is an oblique view showing a position detecting device arranged according to this invention as a second embodiment thereof.
Figure 6:
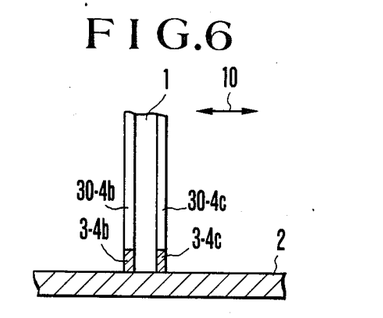
FIG. 6 is a sectional view showing the position detecting device of FIG. 5 as taken along the direction of arrow 9 of FIG. 5.

FIG. 5 shows the second embodiment of this invention. FIG. 6 shows in a sectional view the position detecting device of FIG. 5 taken along the direction of arrow 9 shown in FIG. 5. In FIG. 5, the same reference numerals are used as in FIG. 3 in denoting the same elements or elements arranged to perform the same functions as those shown in FIG. 3. Further description of these same or similar elements is omitted here. Referring to FIG. 5, heads 3-1$b$ to 3-4$b$ are arranged to correspond to codes 5-1 to 5-4. Meanwhile, another group of heads 3-1$c$ to 3-4$c$ are arranged on the opposite side of the detecting part 1 as shown in FIG. 6. The heads 3-1$b$ to 3-4$b$ are repectively provided with electrodes 30-1$b$ and 30-1$b'$ to 30-4$b$ and 30-4$b'$. The heads 3-1$c$ to 3-4$c$ are provided with electrodes 30-1$c$ and 30-1$c'$ to 30-4$c$ and 30-4$c'$. Further, longer codes 5-3 and 5-4 are divided, respectively, into small magnetic domains of S pole and N pole.

Figure 7A:
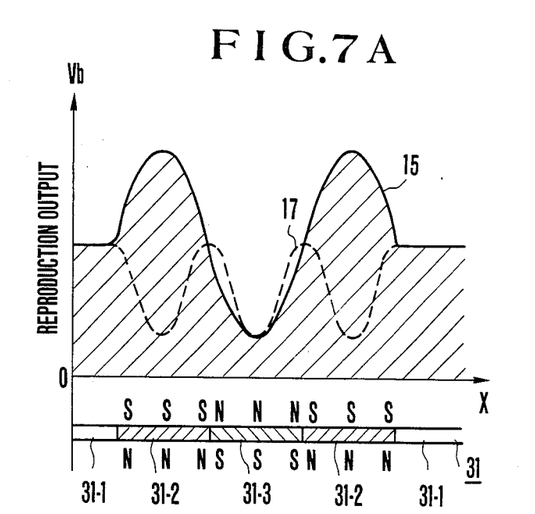
FIGS. 7A and 7B are illustrations showing the outputs of heads 3-4b and 3-4c shown in FIGS. 5 and 6 respectively.
Figure 7B:
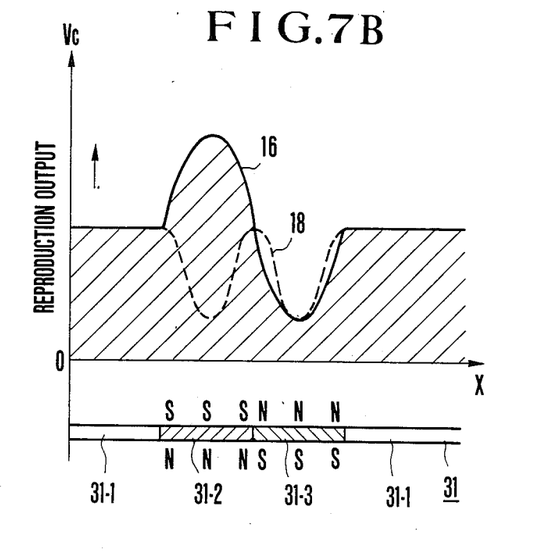

Referring to FIGS. 7A and 7B, operation of the position detecting device of FIG. 5 will now be described: A reference symbol "x" shown on the abscissa axis of each of FIGS. 7A and 7B indicates the extent to which the head 3-4$b$ moves over the code 5-4. A symbol "Vb" shown on the ordinate axis indicates a voltage which is generated when a predetermined current is allowed to flow via the electrodes 30-4$b$ and 30-4$b'$ to the head 3-4$b$. A part 31 shown below the reproduction output in each of these illustrations indicates the magnetizing directions at distance points of movement of the head over the code 5-4. The head is assumed to be sliding over the upper line of the illustration part 31. In the part 31, a code part 31-1 represents a non-magnetized part; a code part 31-2 is magnetized to have an S pole surface; and a code part 31-3 is magnetized to have an N pole surface respectively. A previously mentioned, the resistance value of the MR element which is used for the head of this embodiment decrease as the magnetic field becomes larger, and vice versa. Therefore, in the absence of the magnet 13, the resistance value of the head increases at the boundary between the codes 31-1 and 31-2 as indicated by a broken line 17. Then the output of the head 3-4$b$ increases accordingly. However, in this embodiment, the magnet 13 is provided as shown in FIG. 5. Therefore, when the head 3-4$b$ comes to a part where the code is magnetized to have an N pole surface, as in the case of the code part 31-3, the magnetic field of the code part 31-3 is added to the magnetic field of the magnet 13 to cause the MR head to have the lowest resistance value. When the head 3-4$b$ comes to a part which is not magnetized, as in the code part 31-1, the resistance value is higher because there only exists the magnetic field of the magnet 13. When the head comes to a part where the code is magnetized to have an S pole surface, as in the case of the code part 31-2, the resistance value becomes the highest value thereof because the magnetic field of the magnet 13 and the code part 31-2 offset each other. Accordingly, the output of the head 3-4$b$ becomes as indicated by a full line in FIG. 7A.

FIG. 7B shows the output of the head 3-4$c$ which is disposed at a predetermined distance away from the head 3-4$b$, as shown in FIG. 6. In the same manner as in FIG. 7A, a broken line 18 represents an output obtained where the magnet 13 is not provided while a full line 16 represents the output obtained with the magnet 13 provided. A signal processing circuit for processing the outputs of the heads 3-4$b$ and 3-4$c$ is arranged as shown in FIG. 8.

Figure 8:
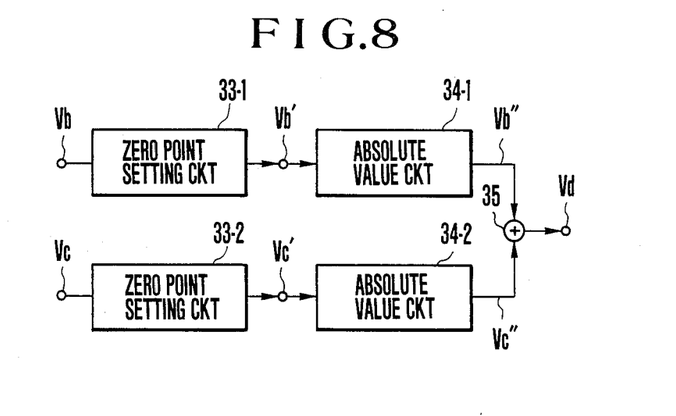
FIG. 8 is a block diagram showing a signal processing circuit arranged to process the outputs shown in FIGS. 7A and 7B.
Figure 9A:
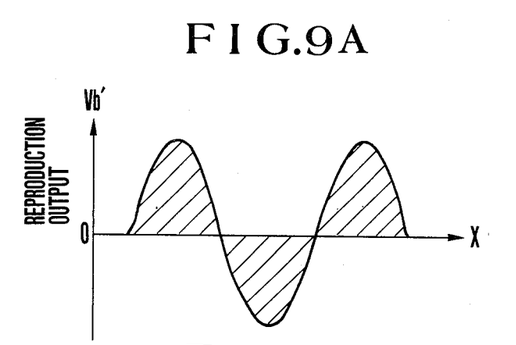
FIGS. 9A-9E are illustrations of outputs of various parts of the signal processing circuit shown in FIG. 8.
Figure 9B:
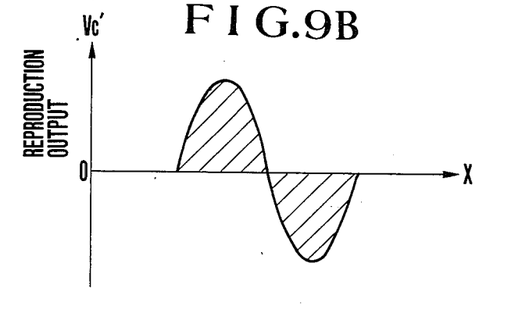
Figure 9C:
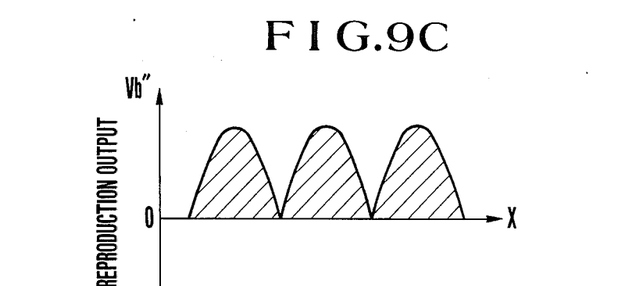
Figure 9D:
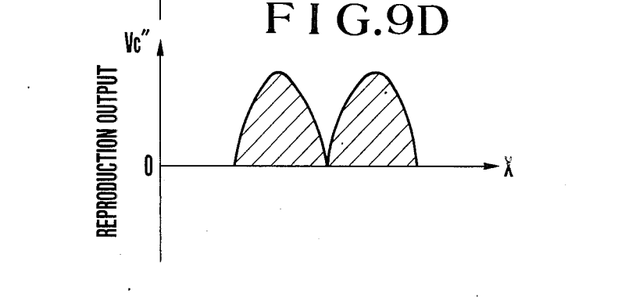
Figure 9E:
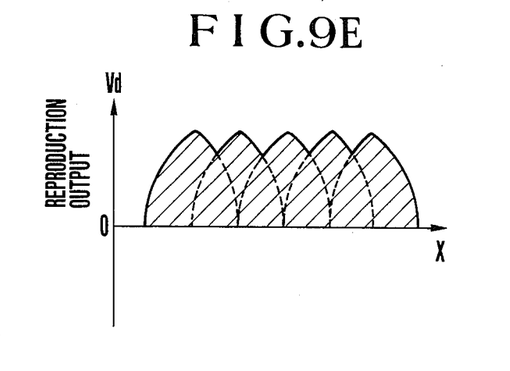

Referring to FIG. 8, the signal processing circuit comprises zero point setting circuits 33-1 and 33-2 which are arranged to obtain voltages Vb' and Vc' as shown in FIGS. 9A and 9B by subtracting a predetermined voltage from the outputs of the heads 3-4$b$ and 3-4$c$ shown in FIGS. 7A and 7B respectively. Absolute value circuits 34-1 and 34-2 are arranged to receive the voltages Vb' and Vc' shown in FIGS. 9A and 9B and to produce voltages Vb" and Vc" as shown in FIGS. 9C and 9D. An adder 35 is arranged to add together the outputs of the absolute value circuits 34-1 and 34-2 and to produce a voltage Vd which is as represented by FIG. 9E. With the signal processing circuit arranged as shown in FIG. 8, an output which is not affected by the influence of the self-demagnetization can be obtained as shown in FIG. 9E.

Figure 10:
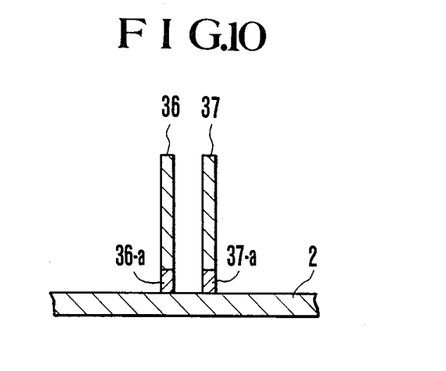
FIG. 10 is a sectional view corresponding to FIG. 6 and showing a position detecting device as a third embodiment of the invention.

FIG. 10 shows the detecting part 1 of a third embodiment of this invention in a sectional view corresponding to FIG. 6. While the magnetic head of the preceding embodiment is formed by embedding a plurality of heads 3-4b and 3-4c as shown in FIG. 6, this embodiment shown in FIG. 10 has the conventional MR heads 36 and 37 spaced in their sliding direction. These heads 36 and 37 are provided with ferromagnetic thin film elements 36-a and 37-a.

In the position detecting device described above as the second or third embodiment arranged to perform a position detecting operation by reading with the magnetic heads the code recorded on a magnetic medium, the code is composed of a plurality of magnetic domains of opposite polarities which are arranged alternately with each other. Meanwhile, the magnetic heads are composed of the ferromagnetic thin film elements which are spaced in the position detecting direction. This arrangement effectively prevents any erroneous operation of the position detecting device due to self-demagnetization.

In the position detecting device described, the degree of the adverse effect of magnetism around the device, such as the earth magnetism, is reduced with a bias magnetic field applied by means of a magnet. However, where the adverse effect of the ambient magnetism is negligible, that is, where the intensity of the magnetic fields obtained by the magnetization of the codes is sufficient against the earth magnetism or the like, the arrangement to obtain the bias magnetic field is dispensable. An embodiment in which the position detecting device is not provided with the bias magnetic field producing means will now be described.

Figure 11A:
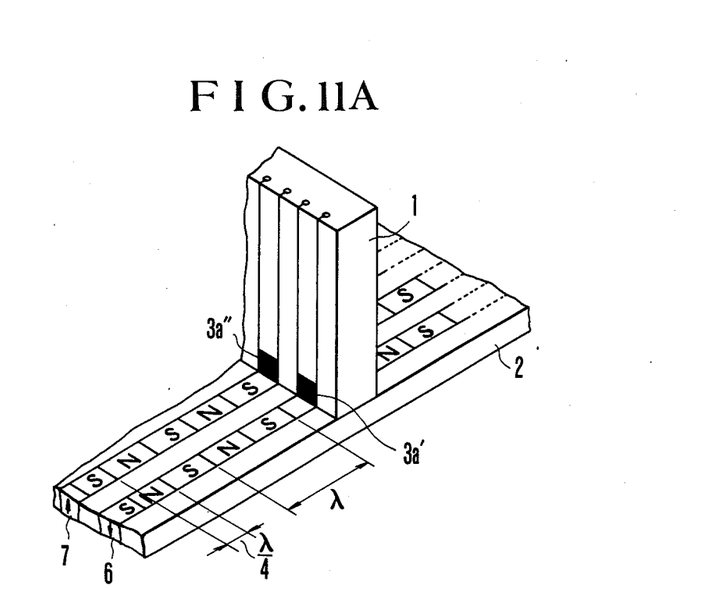
FIG. 11A is an oblique view showing the third embodiment of the invention.
Figure 11B:
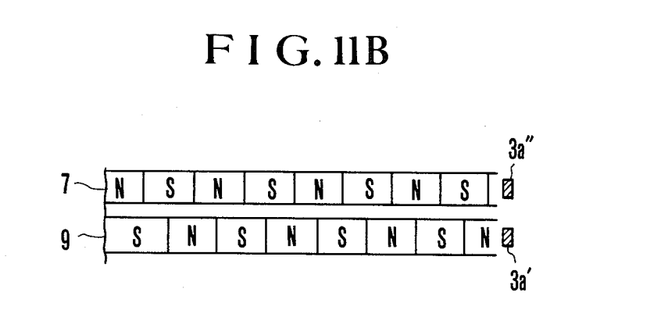
FIG. 11B is a plan view showing tracks 6 and 7 shown in FIG. 11A.

FIG. 11A shows the magnetic position detecting device which is not arranged to produce the bias magnetic field. This drawing is an enlarged view showing, as in FIG. 4A, the arrangement around the higher places of a code. The elements performing the same functions as those shown in FIG. 4A are indicated by the same reference numerals and symbols. As shown in FIG. 11B, each code is divided into two tracks 6 and 7 in this embodiment in the same manner as in FIG. 4B. However, in this embodiment, magnetic domains of the code are arranged in a different manner from the embodiment shown in FIG. 4B. In this case, the length of the N pole magnetic domains is the same as that of the S pole magnetic domains. Additionally, the magnetic domains in one track are arranged to deviate from those of the other track by as much as λ/4 wave length.

Figure 12A:
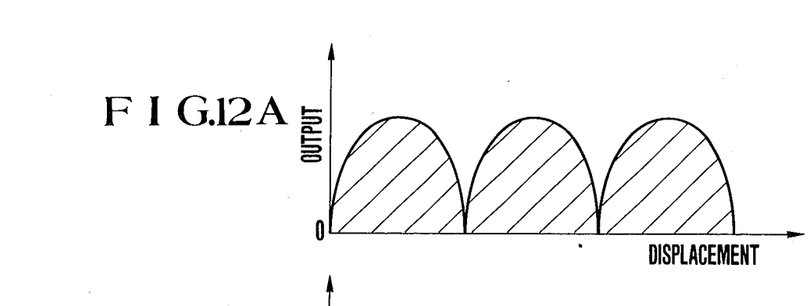
FIGS. 12A-12C show the outputs of heads 3a' and 3a" shown in FIG. 11A.
Figures 12B, 12C:
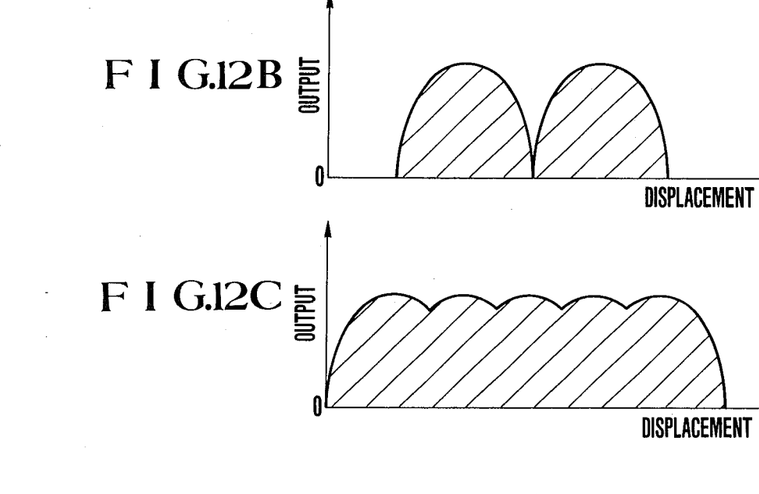

When the heads 3a' and 3a'' which are composed of a magnetoresistive film slide over these tracks 6 and 7, magnetized patterns are read out by each of the heads. The resistance value of each head varies according to whether the pattern is magnetized or not, as previously mentioned. The outputs of these heads obtained as they slide over the tracks thus become as shown in FIGS. 12A and 12B. In each of FIGS. 12A and 12B, a dropped part is produced in the output when the head comes to a boundary between an N pole magnetic domain and an S pole domain.

The outputs shown in FIGS. 12A and 12B are similar to those (FIGS. 9C and 9D) of the second embodiment wherein the outputs are arranged to be processed into absolute values through the absolute value circuit. With the outputs of FIGS. 12A and 12B added together by an adder, a long continuous signal can be obtained without being affected by the adverse effect of self-demagnetization as shown in FIG. 12C.

Further, in the embodiment shown in FIG. 5, the magnet 13 may be dispensed with for avoiding the adverse effect of self-demagnetization without absolute value circuits, as in the case of the embodiment shown in FIG. 11.

What is claimed is:

1. A magnetic position detecting device comprising:
    (a) a plurality of magnetic main tracks for forming a code, each of the tracks having magnetic domains corresponding to the code, and a predetermined main track among said plurality of main tracks including mutually adjoining domains among said magnetic domains having polarities opposite to each other, wherein said magnetic domains of said main tracks forming said code are of the same length;
    (b) a plurality of magnetic field responsive heads corresponding to the main tracks, for scanning the magnetic domains on the main tracks, said heads corresponding to said predetermined main track being spaced a predetermined distance away from each other in the scanning direction thereof, said predetermined distance being substantially 1/2 the length of each of said magnetic domains in the scanning direction; and
    (c) signal processing means for obtaining from the outputs of said spaced heads a signal corresponding to the length of said magnetic domain in said predetermined main track and free from the adverse effect of self-demagnetization, said signal processing means including:
        (a) absolute value producing means for converting an output of said spaced heads into an absolute value; and
        (b) means for summing up an output from said absolute value producing means.

2. A device according to claim 1, wherein said heads are composed of a magnetoresistive film.

3. A device according to claim 1, wherein the magnetic domains of said main tracks are formed by a vertical magnetization film.

4. A magnetic position detecting device comprising:
    (a) a plurality of magnetic tracks for forming a code, each of the tracks having magnetic domains corresponding to the code, at least one of said tracks including:
        (1) a first sub-track consisting of a plurality of magnetic domains, with mutually adjoining domains among said magnetic domains having polarities opposite to each other, and
        (2) a second sub-track consisting of a plurality of magnetic domains, with mutually adjoining domains among said magnetic domains having polarities opposite to each other, said domains being arranged to be different in phase from the domains of said first sub-track;
    (b) two magnetic field responsive heads corresponding to the magnetic domains of said first and second sub-tracks for producing a signal corresponding to lengths of said magnetic domains in said first and second sub-tracks, respectively; and
    (c) signal processing means for summing up the signal from the outputs of the two heads, said signal processing means including:

(a) absolute value producing means for converting an output of said spaced heads into an absolute value; and
(b) means for summing up an output from said absolute value producing means.

5. A magnetic position detecting device, comprising:
(a) a plurality of magnetic main tracks for forming a code, each of the tracks having magnetic domains corresponding to the code, and at least one of the tracks including:
  (1) a first sub-track consisting of a plurality of magnetic domains, with mutually adjoining domains among said plurality of magnetic domains having polarities opposite to each other,
  (2) a second sub-track consisting of a plurality of magnetic domains, with mutually adjoining domains among said plurality of magnetic domains having polarities opposite to each other, with at least a portion of the magnetic domains having a first polarity on the second sub-track being opposite to the magnetic domain having a second polarity on the first sub-track, wherein the mutually adjoining domains are magnetized into N polarity and S polarity, the domain of S polarity, along the scanning direction of the head, being shorter than the domain of N polarity, along the scanning direction of the head;
(b) a plurality of magnetic field responsive heads arranged in correspondence to the main tracks, the main tracks corresponding to the sub-tracks having two magnetic fields responsive to the head, for scanning the magnetic domains in said first and second sub-tracks, respectively; and
(c) signal processing means for summing up a signal corresponding to the length of said magnetic domains from outputs of said heads, said signal processing means being arranged to selected a larger of the outputs from two magnetic field responsive heads.

* * * * *